Dec. 22, 1936.  H. FORD  2,065,065
AUTOMOBILE CHASSIS CONSTRUCTION
Filed May 10, 1935    3 Sheets-Sheet 1

INVENTOR.
Henry Ford
BY
ATTORNEY.

W.
Edwin C. McRae

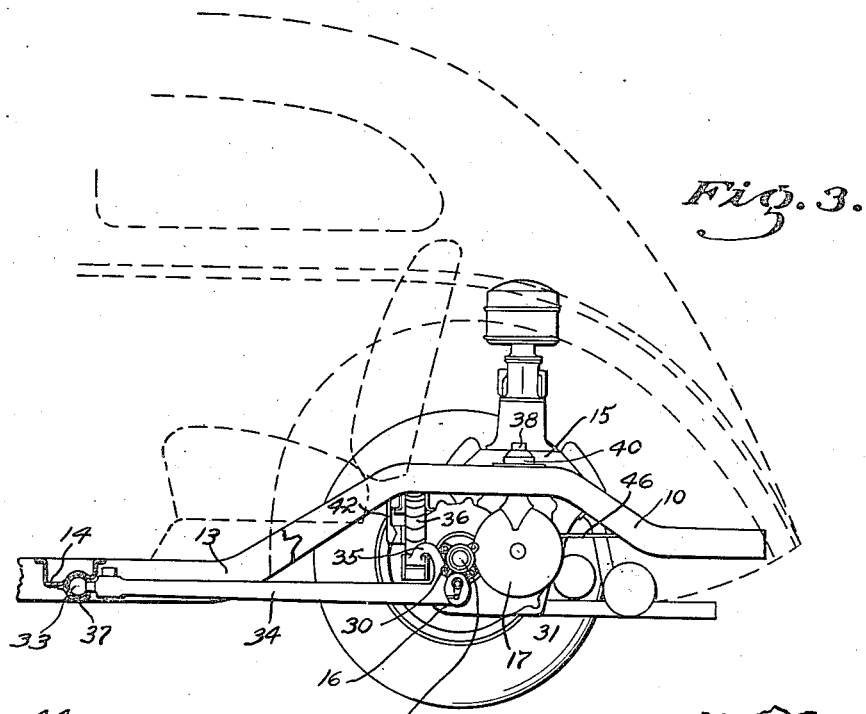
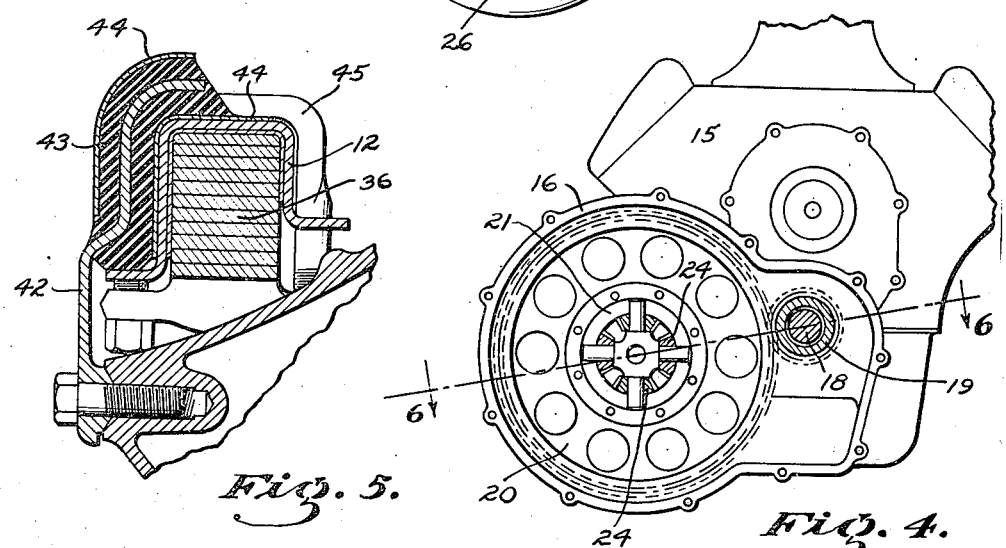

Dec. 22, 1936.  H. FORD  2,065,065
AUTOMOBILE CHASSIS CONSTRUCTION
Filed May 10, 1935   3 Sheets-Sheet 3

W.
Edwin C. McRae

INVENTOR.
Henry Ford
BY
E. L. Davis
ATTORNEY.

Patented Dec. 22, 1936

2,065,065

UNITED STATES PATENT OFFICE 2,065,065

AUTOMOBILE CHASSIS CONSTRUCTION

Henry Ford, Dearborn, Mich., assignor to Ford Motor Company, Dearborn, Mich., a corporation of Delaware Application May 10, 1935, Serial No. 20,797

4 Claims. (Cl. 180—73)

The object of my invention is to provide a novel rear engined and rear wheel driven automobile chassis.

Specifically, my invention resides in what is believed to be a novel rear spring suspension and rear radius rod construction wherein each axle tube and radius rod is secured together as a unit and is so mounted that each unit may oscillate vertically around a horizontal center line which is spaced transversely from the horizontal center line of the car. Increased rigidity results from this construction.

Still a further object of my invention is to provide an automobile chassis wherein the axle gearing, transmission and differential are resiliently supported as a unit in the vehicle frame. The mounting for this unit is so designed that vibration of the motor tends to oscillate the unit around a transverse center line which coincides with the axle drive gear center.

Still a further object of my invention is to provide an automobile having an improved weight distribution to thus provide an easier riding car. The motor and transmission, being disposed rearwardly of the axle, lowers the rate of oscillation of the chassis around its center of gravity so that it approaches that of much heavier cars. Further, by so placing the driving unit the center of gravity of the chassis is moved rearwardly so as to lie almost at the center of the passenger space of the body. Vertical oscillation of the car around the center of gravity has thereby a minimum effect upon the passengers. Improved riding qualities result from this arrangement.

With these and other objects in view, my invention consists in the arrangement, construction and combination of the various parts of my improved device, as described in the specification, claimed in my claims, and illustrated in the accompanying drawings, in which:

Figure 3 is a side elevation of the rear portion of the chassis.

Figure 4 is a vertical central sectional view, taken through the differential and axle driving gear of my improved vehicle.

Figure 5 is a sectional view, taken on the line 5—5 of Figure 1, illustrating the differential support mounting.

Figure 1:
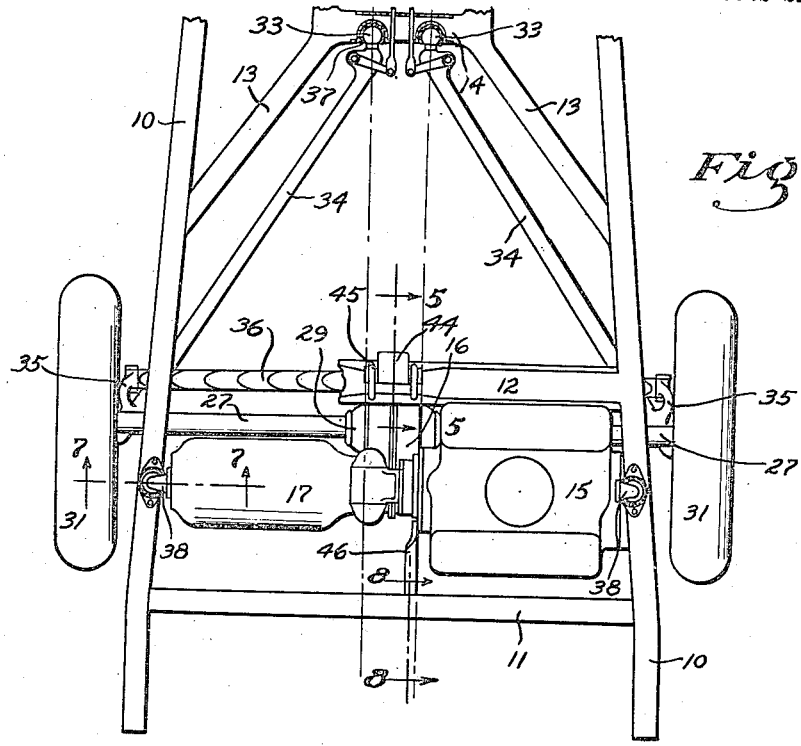
Figure 1 is a plan view of the rear portion of my improved automobile chassis, showing the transverse mounting of the engine and transmission in position rearwardly of the rear axle.

Referring to the accompanying drawings, I have used the reference numeral 10 to indicate the side members of the frame of my motor vehicle, which frame also consists of a rear channel shaped cross member 11. Spaced a short distance forwardly of the rear cross member 11 a spring cross member 12 is provided. The two cross members 11 and 12, together with the frame side members, form a rectangular shaped compartment in which the motor, transmission and differential housing are resiliently supported. A pair of diagonally extending members 13 extend forwardly from the frame side members to position where they are integrally united with a center transverse member 14, which center member forms a support for the forward ends of a pair of radius rods which will later be described.

Referring to the driving mechanism, I have used the reference numeral 15 to indicate an eight cylinder V-type motor which is fixedly secured to half of an axle gear housing 16, while a transmission housing 17 is formed integrally with the other half of the axle gear housing, these two halves being bolted together. The motor crank shaft is splined to a drive shaft which is given the reference numeral 18 and which extends from the engine crank shaft through to the outer end of the transmission housing. Suitable gearing is provided in the transmission whereby the driving torque is conducted inwardly to the center of the unit. The final drive from the transmission is taken through a driving pinion 19 which is mounted to rotate in axial alignment around the drive shaft 18. The particular gearing employed in the transmission will not be described, as it forms no part of my invention and as any one of several types of transmissions may be employed herein without materially altering the working of the device. Planetary gearing is employed herein although a sliding gear type transmission may readily be provided, if desired.

Figure 6:
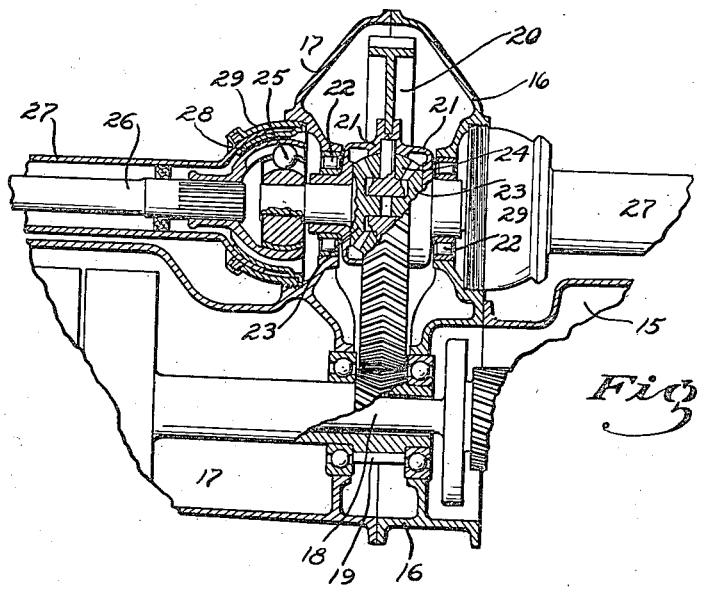
Figure 6 is a sectional view, taken on the line 6—6 of Figure 4.

It will be noted from Figures 4 and 6 that a relatively large herringbone axle gear 20 is rotatably mounted in the axle gear housing so as to mesh with the pinion 19. The axis of the gear 20 extends parallel to the engine crank shaft but is laterally displaced therefrom. The gear 20 is bolted to the periphery of a differential housing 21 which housing 21 is rotatably mounted at each end thereof upon roller bearings 22, these bearings being supported in the axle gear housing 16. The differential housing incloses a pair of conventional differential gears 23 which are in mesh with four differential pinions 24, these pinions being rotatably mounted in fixed position relative to the differential housing 21, in the conventional manner. The center member of a universal joint 25 is secured to a shaft which extends from each of the differential gears 23, the outer member of each joint being splined to an axle shaft 26 whereby the drive from each differential gear is conducted to its respective axle shaft. An axle housing tube 27 is mounted upon a spherical seat 28 and is held in position by a spherical cap 29, the center of each spherical seat and cap coinciding with the center of the adjacent universal joint 25. The two axle tubes 27 extend outwardly where they are fixedly secured to a brake anchor plate supporting flange 30. A driving wheel 31 is rotatably mounted upon the outer end of each tube 27 and the axle shaft 26 extends through each tube and is fixedly secured to its wheel 31 in the conventional manner.

Figure 2:
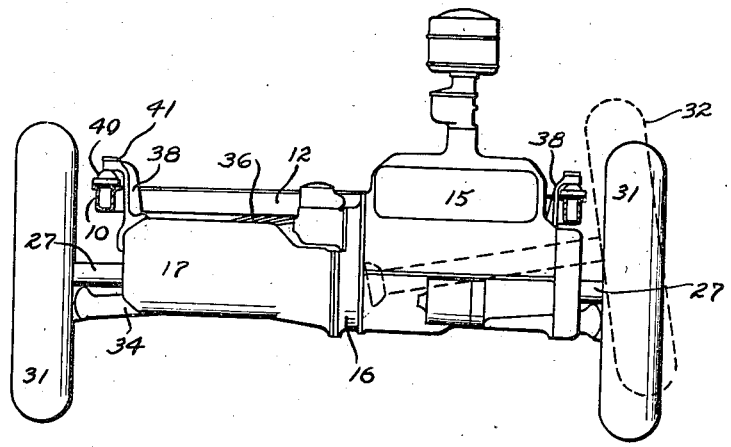
Figure 2 is an end elevation of the chassis shown in Figure 1.

It will be noted that the centers of the two universal joints 25 are spaced a substantial distance from the center line of the car and that the axle tubes 27 oscillate around the centers of these joints to the position shown by dotted lines 32 in Figure 2. Spaced from the center line of the car a distance equal to the spacing of the aforementioned universal joints, I have provided two ball members 33, which ball members are mounted in suitable sockets in the center frame member 14. Rubber inserts are inserted between these balls and the frame member 14, thereby preventing the transmission of road noise to the frame. The forward ends of a pair of radius rods 34 are fixed to the ball members 33, which radius rods extend diagonally, rearwardly and outwardly to positions adjacent to the flanges 30. The outer ends of these rods are bolted to their respective flanges. Each axle tube and radius rod assembly is thereby permitted to oscillate vertically around a center line which passes through its un'versal joint and adjacent ball member 33. A spring perch 35 is forged integrally with each radius rod 34, which spring perches are shackled in the usual manner to the outer ends of a transverse spring 36. The center of the spring 36 is fixedly secured to the center of the spring cross member 12 by a pair of U-bolts 45. Thus, the vehicle frame is resiliently supported upon the outer ends of the radius rods and axles through the transverse spring 36.

A unique feature of my improved device is that each axle tube 27 and adjacent radius rod 34 and spring perch 35 is formed as a unit, no relative movement being permitted between the individual elements which comprise each unit. The two units may, of course, oscillate vertically independently of each other. For this reason it is essential that the motor, transmission and axle gear housing be supported in the frame member so that movement thereof will be no greater than that permitted by the rubber insert 37 plus the normal resiliency of the axle tube and radius rod.

Figure 7:
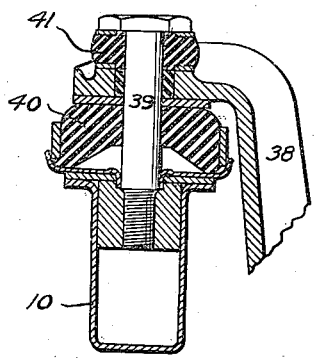
Figure 7 is a sectional view, taken on the line 7—7 of Figure 1.

It will be noted from Figure 7 that the outer end of the motor and the outer end of the transmission are each resiliently supported on the frame side members by suitable brackets 38. A stud 39 extends upwardly from the frame side member to which it is secured and a relatively large rubber compression puck 40 is interposed between the upper end of the bracket and the top of the frame. A rebound puck 41 is interposed between the top of the stud 39 and the bracket. Thus, the motor and transmission are permitted a limited vertical movement to counteract road vibration. In order that movement of the differential be still further limited, a bracket 42 is fixedly secured to the forward portion of the axle gear housing, this bracket extending upwardly where it is vulcanized in the center of a rubber block 43. The block 43 is incased in a housing 44, the ends of which housing are secured to the cross member 12 by means of the spring retaining U-bolts 45. As will be noted from Figure 5, very little fore and aft movement of the axle housing is permitted due to the relatively large area of rubber which extends in a vertical direction, while movement of the housing in a vertical direction is resisted to a lesser extent.

Figure 8:
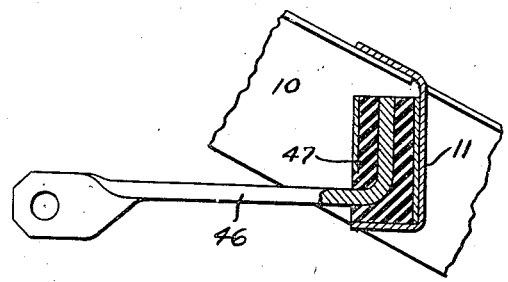
Figure 8 is a sectional view, taken on the line 8—8 of Figure 1.

It will be apparent that vertical movement of the axle gear housing induces no strains in the radius rods and axle tubes unit as the radius rods and axle gear housing simply pivot slightly around the ball member 33 to compensate for this movement. It is the horizontal movement of the axle gear housing which sets up strains in these units. In order to prevent such horizontal movement, a tension member 46 is fixed to the axle gear housing which member extends rearwardly to the rear cross member 11 where it is embedded in a block of rubber 47. The joint between the member 46 and the cross member 11 is illustrated in Figure 8 where it may be seen that very little fore and aft movement of the axle is permitted. The member 46 is of relatively thin cross section so that it bends upon vertical movement of the motor.

Among the many advantages arising from the use of my improved device, it may be well to mention that an exceptionally rigid support for the rear driving wheels is provided. Further, only one universal joint for each wheel is required in this construction.

Still further, by placing the motor rearwardly of the rear wheels, the center of gravity is materially shifted rearwardly so that it coincides with the passenger carrying space and thus improves the roadability of the car.

Some changes may be made in the arrangement, construction and combination of the various parts of my improved device without departing from the spirit of my invention, and it is my intention to cover by my claims such changes as may reasonably be included within the scope thereof.

I claim as my invention:

1. In a chassis construction, a frame having a transverse cross member at one end thereof, a unitary driving unit composed of an internal-combustion engine and axle gear housing and transmission, said transmission being aligned with the crank shaft of said engine and said axle gear housing being offset from said crank shaft, a drive shaft associated with said transmission which conveys the torque of the engine to the outer end of the transmission, a driving pinion rotatably mounted in said unit between said transmission and said engine, said transmission being connected to drive said pinion, an axle gear rotatably mounted in said axle gear housing in mesh with said pinion, the axis of said gear being offset similarly to said axle gear housing, resilient means for supporting the ends of said driving unit upon the side members of said frame with the axis of said engine and transmission extending transversely to said frame, less resilient means for supporting said offset gear housing upon said cross member so that vibration of said unit will move said gear housing to a lesser extent, axle shafts extending outwardly from the sides of said gear housing, said shafts being in driving connection with said axle gear, and driving wheels driven by and mounted at the outer ends of said axle shafts.

2. In a chassis construction, a frame having a transverse cross member disposed near one end thereof, a unitary driving unit composed of an internal-combustion engine and axle gear housing and transmission, said axle gear housing being interposed between said engine and transmission, a drive shaft which extends from the inner end of the engine crank shaft through said transmission, a herringbone type driving pinion rotatably mounted in said unit between said transmission and said engine, said driving pinion being connected to the transmission whereby the torque of said engine is conveyed to the outer end of said transmission and then through the transmission to said driving pinion, a herringbone type axle gear rotatably mounted in said axle gear housing in mesh with said pinion, the axis of said gear being offset from the axis of said crank shaft, resilient means for supporting the ends of said driving unit in said frame with the axis of said engine and transmission extending transversely to said frame, less resilient means for supporting said axle gear housing upon said center cross member so that vibration of said unit will tend to oscillate same around the gear center of said axle gear housing, axle shafts extending outwardly from the sides of said axle gear housing, said shafts being in driving connection with said axle gear, and driving wheels mounted at the outer ends of said axle shafts, said driving wheels having a driving connection with said shafts.

3. In a chassis construction, a frame having center and end transverse cross members, a unitary driving unit composed of an internal-combustion engine having an axle gear housing secured to one end thereof and a transmission secured to said axle gear housing, said transmission being aligned with the crank shaft of said engine and said axle gear housing being offset from said crank shaft, a drive shaft extending from said engine through said transmission so as to convey the torque of the engine to the outer end of said transmission, a driving pinion rotatably mounted around said drive shaft between said transmission and said engine, said pinion being driven by said transmission, means for supporting said driving unit in said frame near one of said end cross members with the axis of said engine and transmission extending transversely to the frame, an axle gear rotatably mounted in said housing in mesh with said pinion, a pair of universal joints rotatably mounted in said axle gear housing one on each side of said gear, a pair of axle tubes mounted upon said housing so as to oscillate vertically around the centers of said universal joints, driving wheels rotatably mounted upon the outer ends of said axle tubes, axle shafts disposed within said axle tubes which form driving connections between said universal joints and said wheels, a pair of radius rods each of which has one end secured to the outer end of one of said axle tubes the other end of each radius rod extending diagonally inwardly to said center cross member where it is pivotally mounted, said pivotal mountings being spaced from the center of the frame a distance equal to one half the spacing between said universal joints, said axle shafts and axle tubes and radius rods and wheels forming a pair of rigid units which oscillate around a pair of laterally spaced horizontal axes, and a spring interposed between the outer end of each axle tube and said frame.

4. In a chassis construction, a frame, a unitary driving unit supported on said frame, said driving unit comprising an internal-combustion engine and an axle gear housing and a transmission, said transmission being aligned with the crank shaft of said engine and said axle gear housing being offset from said crank shaft, a drive shaft associated with said transmission which conveys the torque of said engine to the outer end of said transmission, a driving pinion rotatably mounted in said unit between said transmission and said engine, said transmission being connected to drive said pinion, an axle gear rotatably mounted in said axle gear housing in mesh with said pinion, the axis of said gear being offset similarly to said axle gear housing, means for supporting said driving unit in said frame with the axis of the engine and transmission extending transversely, a pair of universal joints rotatably mounted in said housing on the respective sides of said gear and connected to said gear so as to be driven thereby, a pair of wheel supporting members mounted upon said housing so as to oscillate vertically around the centers of said universal joints, driving wheels rotatably mounted at the outer ends of said supporting members, axle shafts forming driving connections between said universal joints and said wheels, a pair of radius rods each of which has one end fixed to the outer end of one of said wheel supporting members, the other end of each radius rod extending diagonally inwardly to the center of said frame, said inner ends being pivotally mounted upon said frame at points spaced from the center of the frame a distance equal to substantially one half the space between said universal joints so that said axle shaft and wheel supporting members and wheels and radius rods form a pair of units which oscillate around a pair of substantially parallel and horizontal axes, and a spring interposed between the outer ends of the wheel supporting members and said frame.

HENRY FORD.